J. P. HAYES.
Apparatus for Melting Solder.
No. 167,171.
Patented Aug. 31, 1875.
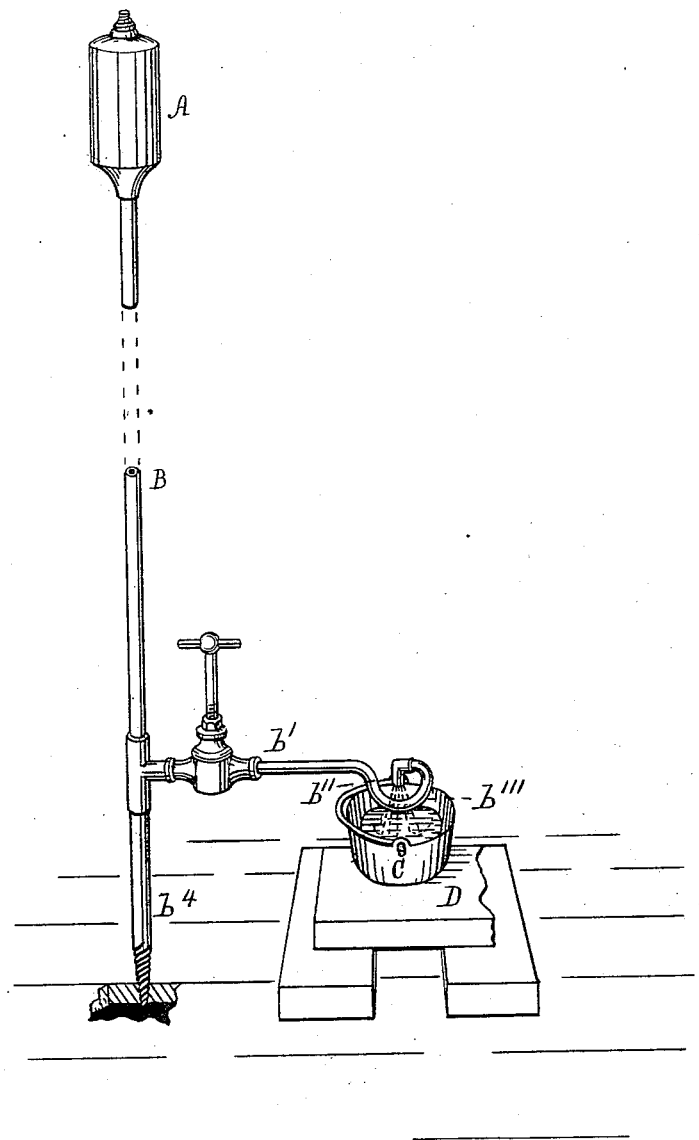
Witnesses:
Benj. Morison
Wm. H. Morison.
Inventor:
John P. Hayes

UNITED STATES PATENT OFFICE.

JOHN P. HAYES, OF PHILADELPHIA, PENNSYLVANIA.

IMPROVEMENT IN APPARATUS FOR MELTING SOLDER.

Specification forming part of Letters Patent No. 167,171, dated August 31, 1875; application filed February 13, 1875.

*To all whom it may concern:*

Be it known that I, JOHN P. HAYES, of the city of Philadelphia, State of Pennsylvania, have invented an Improved Apparatus for Melting Solder in plumbers' ordinary pots, of which the following is a specification:

The object of my invention is twofold—first, to support the fountain and burner of a liquid-hydrocarbon apparatus, without a fixed supporting-base, to be transported or carried therewith; and, second, to melt the solder in the ordinary melting-pot, supported upon an ordinary brick, and without the use of any surrounding or inclosing furnace; and this twofold result I produce by extending the vertical supply-stem about eight inches below the horizontal tube attached to the same, as a solid rod with a gimlet-screw cut around its lower end, so that the fountain or liquid-hydrocarbon reservoir may be readily supported by screwing the gimlet end into a board or ordinary floor of a building, and by causing the flame-jet of the retort-burner to be projected downward upon the solder in the melting-pot, supported directly below the same upon an ordinary brick or other temporary support, as will herein be fully described with reference to the accompanying drawing, in which—

A is the ordinary fountain, communicating through the vertical supporting-tube B and the horizontal valved tube $b'$, with the downward-projecting jet end $b''$ of the curved or retort portion $b'''$ of the same. The solid extension $b^4$ of B is about eight inches long, and has its lower end made like a gimlet-screw, so that the same may be readily screwed into a board or into the floor of a building, for the purpose of securely supporting the reservoir or fountain A and its tubes B and $b'$, as represented in the drawing.

The plumbers' ordinary melting-pot C, containing the solder, only requires to be placed upon an ordinary brick or bricks, D, so as to support the said pot and solder directly under the jet end $b''$ and retort or curved heating portion $b'''$, so that the jet-flame will be projected directly down upon the surface of the solder in the pot C, substantially as represented.

It will be readily understood without further description that, by means of the gimlet-screwed extension $b^4$ of B, the reservoir A and tubes B $b'$ and their attachments can be quickly and securely supported anywhere without a fixed base, which, as heretofore, would have to be carried about with the reservoir and its other attachments; and that, by causing the flame to be projected directly downward from the jet end of the tube $b'$ directly upon the upper surface of the solder in the pot C, supported substantially as described, the solder can be easily melted, and thus the cumbersome and heavy furnace heretofore required dispensed with.

I claim as my invention—

The apparatus consisting of the fountain A, tubes B and $b'$, with downward-projecting jet $b''$ and the retort $b'''$, in combination with the solid gimlet-screwed extension $b^4$ of the vertical tube B, the whole being constructed and supported as and for the purposes hereinbefore set forth and described.

JOHN P. HAYES.

Witnesses:
BENJ. MORISON,
WM. H. MORISON.